(12) United States Patent
Flores et al.

(10) Patent No.: US 11,421,768 B1
(45) Date of Patent: Aug. 23, 2022

(54) TORQUE CONVERTER HAVING STAMPED PILOT PLATE WITH CROSS FLOW TO PRESSURE CHAMBERS

(71) Applicant: Schaeffler Technologies AG & Co. KG, Herzogenaurach (DE)

(72) Inventors: Angel Salvador Flores, Puebla (MX); Luis Alberto Bernal, Puebla (MX)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/232,305

(22) Filed: Apr. 16, 2021

(51) Int. Cl.
F16H 45/02 (2006.01)

(52) U.S. Cl.
CPC ....... *F16H 45/02* (2013.01); *F16H 2045/021* (2013.01); *F16H 2045/0215* (2013.01); *F16H 2045/0294* (2013.01)

(58) Field of Classification Search
CPC ..... F16H 45/02; F16H 2045/0205–021; F16H 2045/0273–0294
See application file for complete search history.

(56) References Cited

U.S. PATENT DOCUMENTS

| | | | |
|---|---|---|---|
| 9,188,212 B2* | 11/2015 | Vanni | F16H 45/02 |
| 9,285,025 B2* | 3/2016 | Matsuoka | F16H 45/02 |
| 9,303,747 B2* | 4/2016 | Mototsune | F16D 25/0635 |
| 9,309,956 B2* | 4/2016 | Lindemann | F16D 25/0638 |
| 9,995,381 B2 | 6/2018 | Adari | |
| 10,288,158 B2* | 5/2019 | Saka | F16F 15/145 |
| 10,451,158 B2 | 10/2019 | Vanni et al. | |
| 11,143,280 B2* | 10/2021 | Cai | F16H 41/30 |
| 2013/0224002 A1* | 8/2013 | Ito | F16H 41/30 |
| | | | 415/182.1 |
| 2018/0291989 A1* | 10/2018 | Krause | F16H 45/02 |

* cited by examiner

*Primary Examiner* — Ernesto A Suarez
*Assistant Examiner* — James J Taylor, II

(57) ABSTRACT

A torque converter comprising a cover arranged to receive torque, an impeller having an impeller shell non-rotatably connected to the cover, and a turbine in fluid communication with the impeller and including a turbine shell is provided. In embodiments, the torque converter includes a piston plate; and a seal plate disposed axially between the piston plate and the turbine, wherein the piston plate is sealed to the seal plate at an outer diameter thereof. A pilot flow plate is disposed axially between the cover and the seal plate, wherein the pilot flow plate is fixed to the cover on a first axial side and fixed to the seal plate on a second, opposite axial side.

20 Claims, 4 Drawing Sheets

TORQUE CONVERTER HAVING STAMPED PILOT PLATE WITH CROSS FLOW TO PRESSURE CHAMBERS

TECHNICAL FIELD

The present disclosure relates generally to torque converters and more specifically to torque converters having multiple fluid passages to supply fluid to pressure chambers.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. Torque converters may have multiple flow passages for clutch apply and release. It is known to use cross-flow hubs for providing flow paths for clutch apply and release pressure chambers. However, these cross-flow hubs may be expensive and add complexity to a torque converter design. Accordingly, it is desirable to provide alternative methods for providing fluid flow paths to pressurized chambers of a torque converter.

SUMMARY

Embodiments of this disclosure provide a torque converter comprising a cover arranged to receive torque, an impeller having an impeller shell non-rotatably connected to the cover, and a turbine in fluid communication with the impeller and including a turbine shell. In embodiments, the torque converter includes a piston plate; and a seal plate disposed axially between the piston plate and the turbine, wherein the piston plate is sealed to the seal plate at an outer diameter thereof. A pilot flow plate is disposed axially between the cover and the seal plate, wherein the pilot flow plate is fixed to the cover on a first axial side and fixed to the seal plate on a second, opposite axial side. The pilot flow plate is formed by stamping. The piston plate is sealed to the pilot flow plate at an inner diameter. A first fluid chamber is formed by the piston plate and the seal plate, wherein the first fluid chamber is configured to receive pressurized fluid to axially displace the piston plate to close the lock-up clutch. A second fluid chamber is formed by the cover and the piston plate; and a third fluid chamber is formed by the cover and the pilot flow plate, wherein the second and third fluid chambers are in fluid communication and configured to receive circulation flow routed from the lock-up clutch. The first fluid chamber is sealed from the second and third fluid chambers.

In embodiments, the pilot flow plate includes at least one recessed portion defined in the first axial side and extending from the first axial side toward the second axial side such that a gap is formed between the cover and the pilot flow plate. The gap fluidly connects the second fluid chamber to the third fluid chamber for fluid flow therethrough. In embodiments, the pilot flow plate further includes a first opening extending axially through the second axial side; and the seal plate includes a second opening extending axially therethrough and radially aligned with the first opening, wherein the circulation flow is configured to be routed through the second fluid chamber, the gap, the third fluid chamber and returned to the input shaft via the first and second openings. In embodiments, the seal plate is arranged to seal to the transmission input shaft at an inner end and the cover is fixed to the pilot flow plate at an inner end.

Embodiments disclosed herein provide the advantageous benefit of reduced costs and complexity of three-pass torque converters, for example, by removing a hub that is typically used to direct flow to appropriate apply and cooling circuits. Furthermore, embodiments disclosed herein offer design advantages by creating a cross-flow configuration without any forgings or costly cross drilling operations. Moreover, embodiments disclosed herein allow for use of a twin plate clutch design, which requires higher clutch load.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
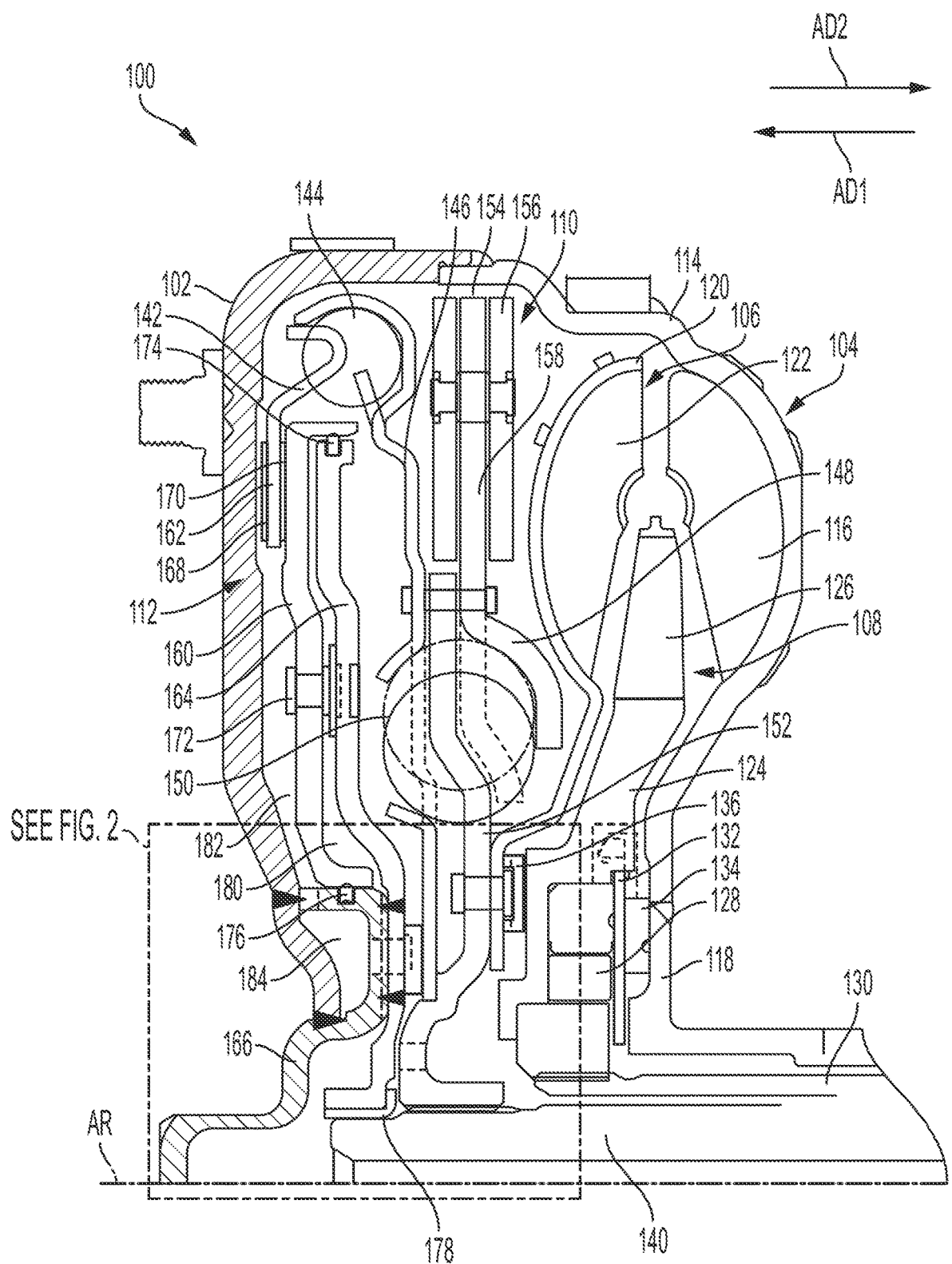
FIG. 1 is a cross-sectional view of a torque converter configured for cross flow to pressure chambers according to an embodiment of the present disclosure.
Figure 2:
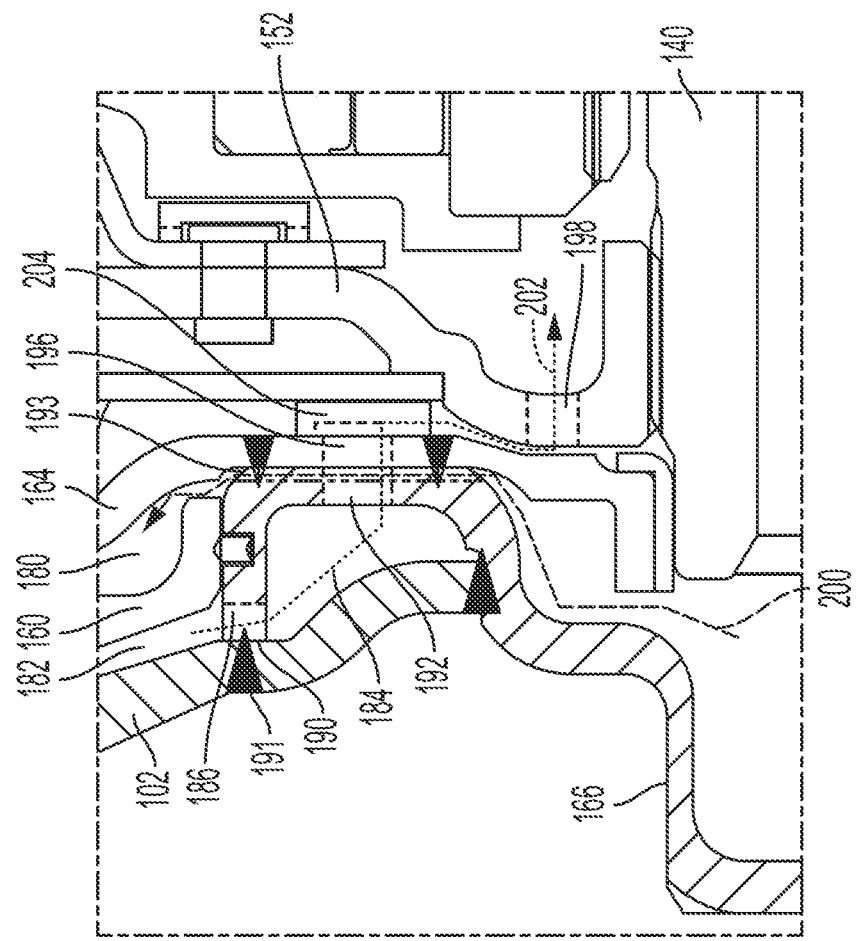
FIG. 2 is an enlarged view of an area of the torque converter shown in FIG. 1 showing cross flow to pressure chambers.
Figure 4:
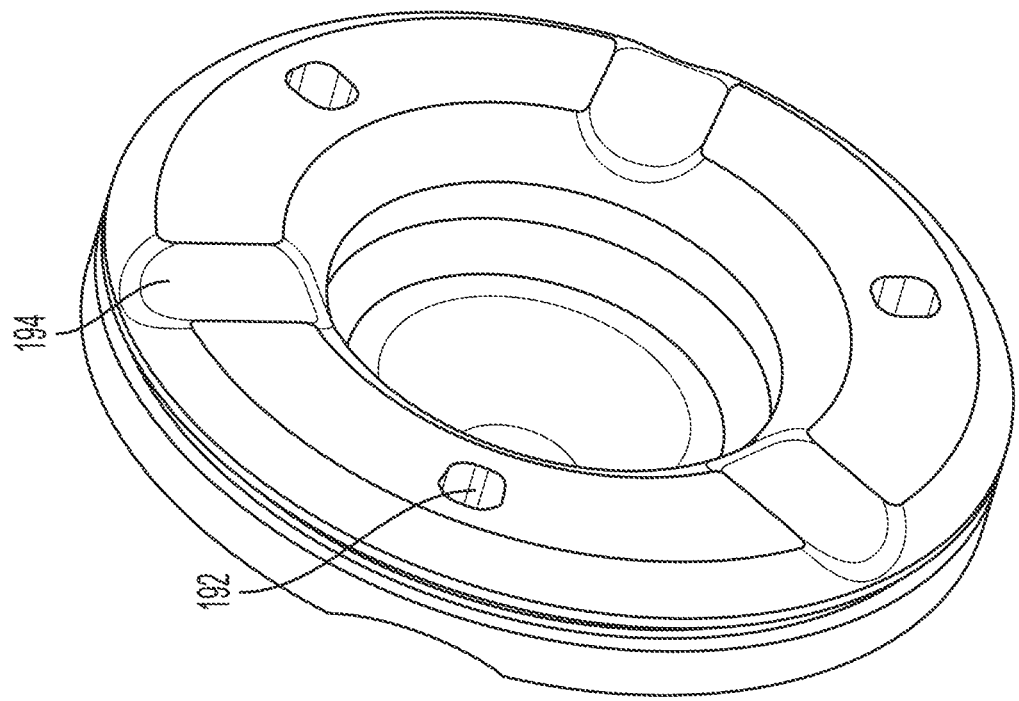
FIG. 4 is a front view of the stamped pilot flow plate of the torque converter shown in FIG. 1.
Figure 3:
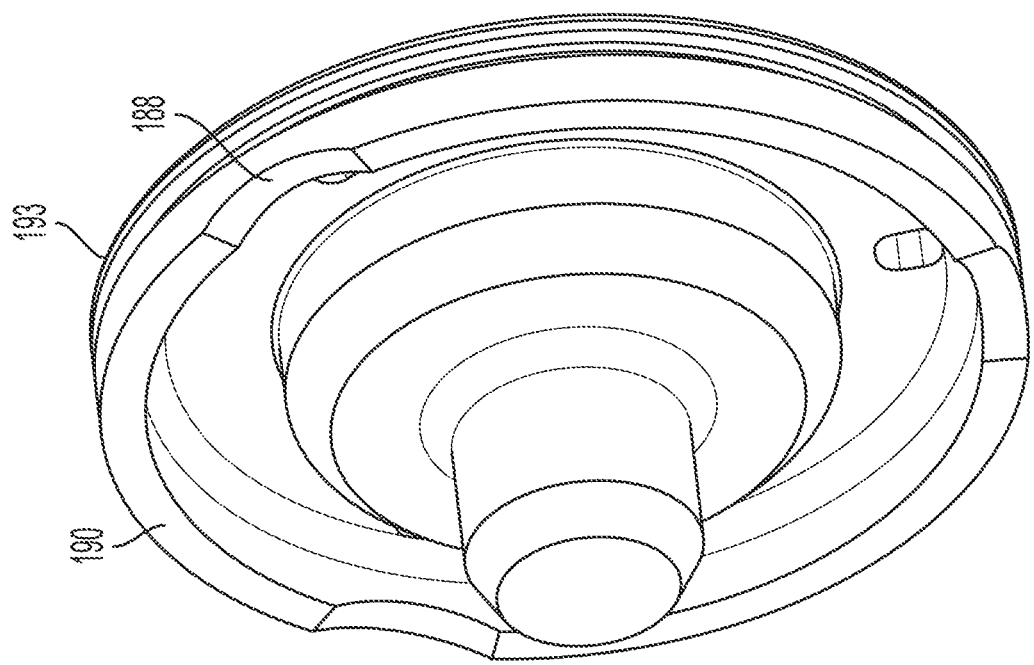
FIG. 3 is a back view of the stamped pilot flow plate of the torque converter shown in FIG. 1.
Figure 5:
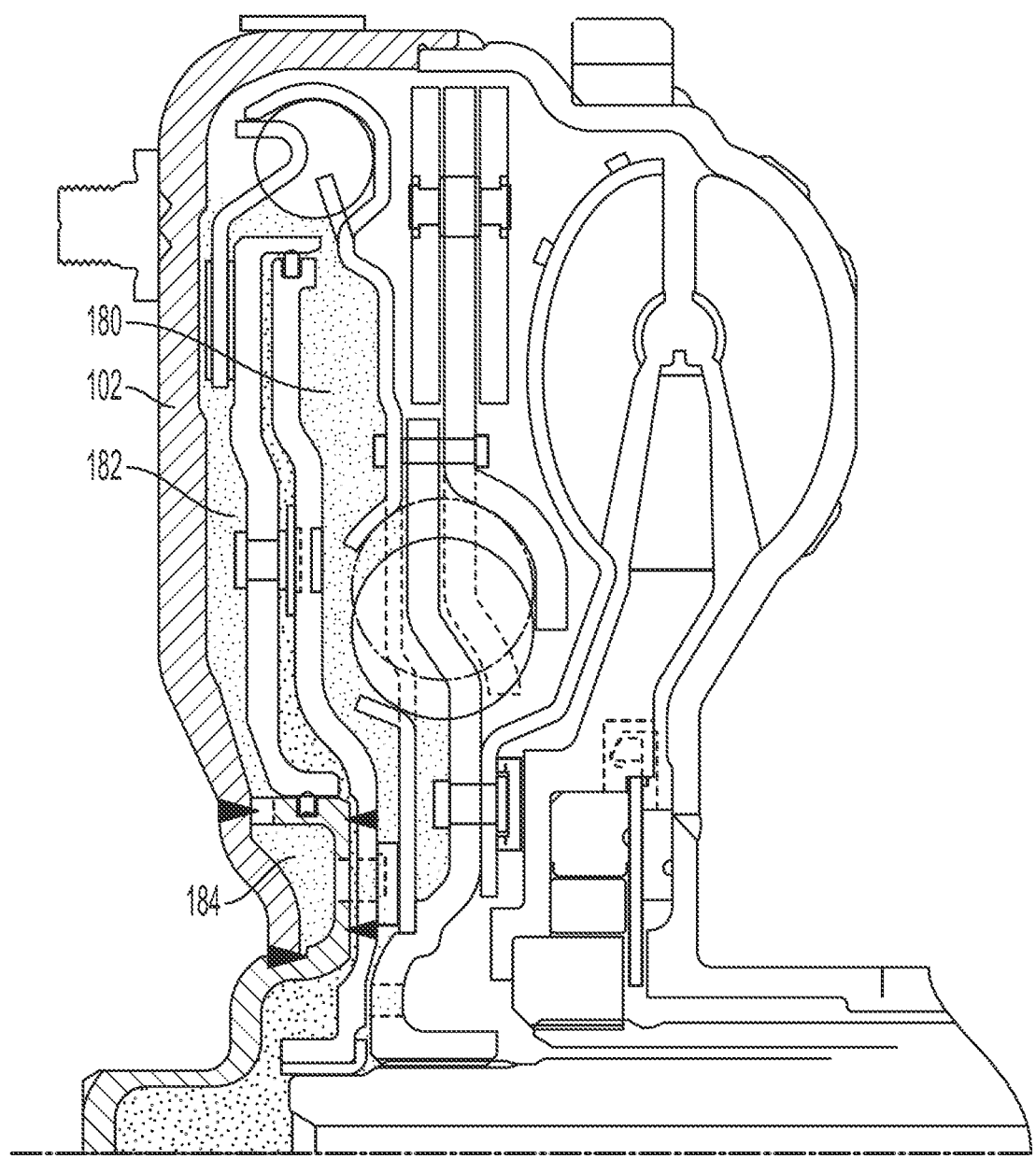
FIG. 5 shows the cross-flow areas of the torque converter shown in FIG. 1.

FIG. 1 shows a torque converter 100 in accordance with an embodiment of the present disclosure. FIG. 2 shows an enlarged view of an area of torque converter 100 showing cross flow into pressure chambers. FIGS. 3-4 show the stamped pilot flow plate of torque converter 100. FIG. 5 shows the cross-flow areas of torque converter 100. The following description is made with reference to FIGS. 1-5. Torque converter 100 includes: axis of rotation AR; front cover 102 arranged to receive torque; impeller assembly 104; turbine assembly 106; stator assembly 108, damper assembly 110; and lock up clutch assembly 112. Impeller assembly 104 includes: impeller shell 114 non-rotatably connected to front cover 102; at least one impeller blade 116 attached to impeller shell 114; and impeller hub 118 fixed to impeller shell 114 at an inner end thereof. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

Turbine assembly 106 includes: turbine shell 120; and at least one turbine blade 122. Stator assembly 108 may be disposed axially between turbine assembly 106 and impeller assembly 104 to redirect fluid flowing from turbine blades 122 before the fluid reaches impeller assembly 104 to increase the efficiency of torque converter 100. Stator assembly 108 may further include: stator body 124; at least one stator blade 126 attached thereto; one-way clutch 128; and stator hub 130. Side plate 132 may be provided axially between stator assembly 108 and impeller assembly 104 and may be configured to retain or hold one-way clutch 128 within stator body 124. Axial thrust washer 134 may be provided axially between stator assembly 108 and impeller assembly 104 and may be attached to an outer circumference of side plate 132. Axial thrust washer 136 may further be provided axially between a radially extending inner portion of turbine shell 120 and stator assembly 108.

Damper assembly 110 is positioned axially between front cover 102 and turbine assembly 106 and is configured for transferring torque from front cover 102 to transmission input shaft 140. Damper assembly 110 may include: input ring 142; springs 144 drivingly engaged with input ring 142; cover plate 146; cover plate 148; springs 150; output element 152;

and centrifugal pendulum absorber 154. Cover plate 146 may act as a retainer for springs 144 and may support springs 150 on one axial side. Cover plate 148 may support springs 150 on another, opposite axial side. Cover plates 146, 148 may be connected, for example, via a rivet radially outside springs 150. Centrifugal pendulum absorber 154 may include masses 156 supported on flange 158, wherein flange 158 may be formed integrally with cover plate 148.

Output element 152 is connected to input shaft 140 for torque transmission therebetween, wherein cover plate 146 may be centered and supported on output element 152. Output element 152 may further be connected to turbine shell 120, for example, by a rivet.

Lock-up clutch assembly 112 is configured to selectively transfer torque from front cover 102 to transmission input shaft 140 and includes: piston plate 160; clutch plate 162;

seal plate 164; and pilot flow plate 166. Clutch plate 162 is disposed between front cover 102 and piston plate 160 and connected to input ring 142 of damper assembly 110. That is, clutch plate 162 may be integrally formed with input ring 142 as a single-piece construction to transfer torque from front cover 102 to damper assembly 110. Moreover, friction material or facing 168 may be disposed between and affixed to one of front cover 102 and clutch plate 162; and friction material or facing 170 may be disposed and affixed to one of clutch plate 162 and piston plate 160. Friction material 168, 170 may include grooves for cooling flow therethrough. Piston plate 160 may be disposed axially between front cover 102 and seal plate 164 and configured to be sealed to seal plate 164 at an outer end thereof via seal 174 and sealed to pilot flow plate 166 at an inner end thereof via seal 176. Piston plate 160 may further be connected to seal plate 164 via a leaf-spring connection 172 that allows axial displacement of piston plate 160 in first axial direction AD1 and second axial direction AD2 for selective engagement of lock-up clutch 112. Seal plate 164 is sealed to, and centered on, input shaft 140 at an inner end thereof, for example, via bushing 178. Pilot flow plate 166 is disposed, at least partially, between front cover 102 and seal plate 164; and is fixed to front cover 102 on one side and fixed to seal plate 164 on the other side, for example via welding. Front cover 102 may be fixed to pilot flow plate 166 at an inner diameter or end thereof. Pilot flow plate 166 may be a stamped part. That is, pilot flow plate 166 may be formed by stamping and then machined for desired finished surfaces. In this way, pilot flow plate 166 reduces costs and complexity associated with typical forged pilot hubs.

Torque converter 100 includes fluid chamber 180, fluid chamber 182 and fluid chamber 184, wherein fluid chamber 180 is sealed from fluid chambers 182, 184 via seals 174, 176. Fluid chamber 180 is formed or bounded, at least in part, by piston plate 160 and seal plate 164 and configured to receive pressurized fluid to engage or close lock-up clutch 112 by axially displacing piston plate 160 in first axial direction AD1. Fluid chamber 182 is formed or bounded, at least in part, by front cover 102 and piston plate 160. Fluid chamber 184 is formed or bounded by front cover 102 and pilot flow plate 166. Fluid chamber 182 and 184 are in fluid communication with each other via openings 186 formed by recessed portions or notches 188 of pilot flow plate 166. That is, recessed portions or notches 188 extend in second axial direction AD2 from axial side 190 facing front cover 102 toward axial side 193 such that openings or gaps 186 are formed between front cover 102 and pilot flow plate 166 thereby allowing fluid flow between fluid chamber 182 and fluid chamber 184. Recessed portions 188 are formed in between welds 191 that fix pilot flow plate 166 to front cover 102. In example embodiments, pilot flow plate 166 may include three recessed portions 188. However, it is to be understood that fewer or more recessed portions may be included. Moreover, fluid chambers 182 and 184 are configured to receive circulation flow that has been routed through friction facings 168, 170 of lock-up clutch 112 for cooling therein and return the circulation flow to input shaft 140. By "bounded in part," we mean that a portion of the cited chamber, flow path, or other structure is bounded, or formed, by the cited element.

Pilot flow plate 166 further includes openings 192 extending axially therethrough and grooves 194 formed in axial side 193 and circumferentially spaced between openings 192. In example embodiments, pilot flow plate 166 may include three openings 192 and three grooves 194; however, it is to be understood that fewer or more openings and grooves may be included. Openings 192 are provided to return circulation flow from fluid chamber 184 to input shaft 140. Grooves 194 are provided to allow fluid flow between fluid chamber 180 and input shaft 140. Seal plate 164 may further include opening 196 extending axially therethrough and radially aligned with opening 192 such that fluid may flow through both opening 192 and 196 to return circulation flow from fluid chamber 184 to input shaft 140. Output element 152 may further include opening 198 defined therein. Opening 198 may be arranged such that circulation flow may pass through pilot flow plate opening 192, seal plate opening 196, and then through output element opening 198 to be returned to input shaft 140.

Torque converter 100 includes flow path 200 and flow path 202, wherein flow path 200 is sealed from flow path 202. Flow path 200 is arranged and configured to supply pressurized fluid to and from fluid chamber 180 and is formed and bounded, at least in part, by pilot flow plate 166 and seal plate 164. That is, pressurized fluid may be supplied from input shaft 140 and then routed between pilot flow plate 166 and seal plate 164 via grooves 194 to fluid chamber 180. Flow path 202 is arranged and configured to return circulation flow from fluid chambers 182 and 184 to input shaft 140 and may be formed and bounded, at least in part, by opening or gap 186, pilot flow plate opening 192, seal plate opening 196, seal plate 164, output element 152 and output element opening 198. That is, fluid may be routed from fluid chamber 182 to fluid chamber 184 through opening 186, then from fluid chamber 184 through pilot flow plate opening 192 and seal plate opening 196, and then routed between seal plate 164 and output element 152, and then exit through output element opening 198 to be returned to input shaft 140. Flow path 200 does not pass through pilot flow plate opening 192 and seal plate opening 196. That is, flow path 200 is sealed from flow path 202. Torque converter 100 may further include washer 204 disposed between seal plate and cover plate 146.

For a lock-up mode for torque converter 100, in which piston plate 160 is non-rotatably connected to cover 102 and the torque is transmitted to output element 152 through clutch 112, pressurized fluid is arranged to flow through flow path 200 extending between pilot flow plate 166 and seal plate 164 into fluid chamber 180 to displace piston plate 160 in axial direction AD1 to connect piston plate 160 with cover 102 bypassing the hydrodynamic fluid coupling. That is, a fluid pressure in fluid chamber 180 is greater than a fluid pressure in fluid chamber 182 thereby resulting in axial displacement of piston plate 160 in axial direction AD1.

For a torque converter mode for torque converter 100, in which cover 102 is rotatable with respect to piston plate 160 and the torque bypasses clutch 112, the fluid pressure in fluid chamber 182 is greater than a fluid pressure in fluid chamber 180 thereby resulting in axial displacement of piston plate 160 in axial direction AD2 away from front cover 102.

For a circulation or cooling of torque converter 100, circulation or cooling flow is routed through lock-up clutch 112 (e.g., flow may be routed through friction facings 168, 170) into fluid chamber 182, through opening or gap 186 formed between pilot flow plate 166 and front cover 102, into fluid chamber 184 through flow path 202 to be returned to input shaft 140. That is, circulation or cooling flow may be routed from fluid chamber 184 through openings 192, 196 in pilot flow plate 166 and seal plate 164, respectively, then between seal plate 164 and output element 152, and exit through opening 198 in output element 152 to be returned to input shaft 140.

Embodiments according to the present disclosure provide various advantages including cost reductions by creating a cross flow configuration without any forgings or costly cross drilling operations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller assembly
106 turbine assembly
108 stator assembly
110 damper assembly
112 lock-up clutch assembly
114 impeller shell
116 one impeller blade
118 impeller hub
120 turbine shell
122 one turbine blade
124 stator body
126 one stator blade
128 one-way clutch
130 stator hub
132 side plate
134 washer
136 washer
140 transmission input shaft
142 input ring
144 springs
146 cover plate
148 cover plate
150 springs
152 output element
154 centrifugal pendulum absorber
156 masses
158 flange
160 piston plate
162 clutch plate
164 seal plate
166 pilot flow plate
168 friction facings
170 friction facings
172 leaf-spring connection
174 seal
176 seal
178 bushing
180 fluid chamber
182 fluid chamber
184 fluid chamber
186 gaps or openings
188 recessed portions or notches
190 axial side
191 welds
192 pilot flow plate opening
193 axial side
194 grooves
196 seal plate opening
198 output element opening
200 flow path
202 flow path
204 washer

What is claimed is:

1. A torque converter, comprising:
a cover arranged to receive torque;
an impeller having an impeller shell non-rotatably connected to the cover;
a turbine in fluid communication with the impeller and including a turbine shell;
a lock-up clutch including:
a piston plate; and
a seal plate disposed axially between the piston plate and the turbine, wherein the piston plate is sealed to the seal plate at an outer diameter thereof; and
a pilot flow plate disposed axially between the cover and the seal plate, wherein the pilot flow plate is fixed to the cover on a first axial side and fixed to the seal plate on a second, opposite axial side, wherein the pilot flow plate is fixed to an innermost end of the cover and arranged such that the pilot flow plate, the cover and the impeller shell together form a housing of the torque converter;
wherein the pilot flow plate includes a first opening extending axially therethrough and the seal plate includes a second opening extending axially therethrough and radially aligned with the first opening;
wherein the pilot flow plate includes a flange disposed radially outside the first opening and abutting the cover, the piston plate being sealed to the flange.

2. The torque converter according to claim 1, wherein the pilot flow plate is formed by stamping.

3. The torque converter according to claim 1, wherein the piston plate is sealed to the pilot flow plate at an inner diameter.

4. The torque converter according to claim 1, wherein a first fluid chamber is formed by the piston plate and the seal plate, wherein the first fluid chamber is configured to receive pressurized fluid to axially displace the piston plate to close the lock-up clutch.

5. The torque converter according to claim 4, wherein:
a second fluid chamber is formed by the cover, the pilot flow plate, and the piston plate; and
a third fluid chamber is formed by the cover and the pilot flow plate, wherein the second and third fluid chambers are on opposited radial sides of the flange, wherein the second and third fluid chambers are in fluid communication and configured to receive circulation flow routed from the lock-up clutch.

6. The torque converter according to claim 5, wherein the first fluid chamber is sealed from the second and third fluid chambers.

7. The torque converter according to claim 5, wherein the flange includes at least one recessed portion defined in the first axial side and extending from the first axial side toward the second axial side such that a gap is formed between the cover and the recessed portion of the flange.

8. The torque converter according to claim 7, wherein the gap fluidly connects the second fluid chamber to the third fluid chamber for fluid flow therethrough.

9. The torque converter according to claim 7,
wherein the circulation flow is configured to be routed through the second fluid chamber, the gap, the third fluid chamber and returned to an input shaft via the first and second openings.

10. The torque converter according to claim 1, wherein the seal plate is arranged to seal to a transmission input shaft at an inner end.

11. The torque converter according to claim 1, wherein the pilot flow plate is fixed to an axial side of the cover.

12. A torque converter, comprising:
a cover arranged to receive torque;
an impeller having an impeller shell non-rotatably connected to the cover;
a turbine in fluid communication with the impeller and including a turbine shell;
an output element attached to the turbine shell and arranged to connect with a transmission input shaft;
a lock-up clutch configured to selectively transfer torque from the cover to the output element and including:
a piston plate; and
a seal plate disposed axially between the piston plate and the turbine, wherein the piston plate is sealed to the seal plate; and
a pilot flow plate fixed to the cover on a first axial side and fixed to the seal plate on a second, opposite axial side, wherein a first fluid chamber is formed by the piston plate and the seal plate, a second fluid chamber is formed by the cover, the pilot flow plate, and the piston plate, and a third fluid chamber is formed by the cover and the pilot flow plate, wherein the pilot flow plate is further fixed to an innermost end of the cover and arranged such that the pilot flow plate, the cover and the impeller shell together form a housing of the torque converter;
wherein the pilot flow plate includes a first opening extending axially therethrough and the seal plate includes a second opening extending axially therethrough and radially aligned with the first opening;
wherein the pilot flow plate includes a flange disposed radially outside the first opening and abutting the cover, the piston plate being sealed to the flange.

13. The torque converter according to claim 12, wherein the first fluid chamber is configured to receive pressurized fluid to axially displace the piston plate to close the lock-up clutch and the second and third fluid chambers are in fluid communication and configured to receive circulation flow routed from the lock-up clutch.

14. The torque converter according to claim 13, wherein at least one groove is formed in the second axial side of the pilot flow plate and the pressurized fluid is routed through the groove to the first chamber.

15. The torque converter according to claim 14, wherein:
a first flow path is formed between the second axial side of the pilot flow plate and the seal plate and is configured to supply the pressurized fluid to the first fluid chamber; and
a second flow path is formed by the first opening, the second opening, the seal plate and the output element and is configured to route circulation flow from the third fluid chamber through the first and second openings to the input shaft.

16. The torque converter according to claim 15, wherein the output element includes an opening and is configured such that circulation flow passes through the first and second openings and then through the output element opening.

17. The torque converter according to claim 15, wherein the first flow path is sealed from the second flow path.

18. The torque converter according to claim 12, wherein the pilot flow plate is a stamped part.

19. The torque converter according to claim 12, wherein the piston plate is sealed to the seal plate at an outer end and sealed to the flange at an inner end.

20. The torque converter according to claim 12, wherein the second and third fluid chambers are on opposite radial sides of the flange.

* * * * *